Patented Mar. 2, 1948

2,436,954

UNITED STATES PATENT OFFICE 2,436,954

PRINTING INK

Richard A. Denton, Riverton, N. J., assignor to Sun Chemical Corporation, a corporation of Delaware No Drawing. Application January 29, 1944, Serial No. 520,320

8 Claims. (Cl. 260—7)

This invention relates to printing inks, and more particularly to inks which are to be set, or "dried," by applying water (for example, as water, steam, spray) immediately after printing, such inks being generally referred to as steam or water-setting inks.

Such an ink, in its necessary characteristics, presents the conflicting requirements that while it must have sufficient "press stability" so that in use it will distribute readily upon the printing rolls, without setting up or hardening or pulling away from the roll under all operating conditions of pressroom humidity, nevertheless it must be sufficiently responsive to the moisture which is applied after printing so that it will dry or set—that is, harden to non-offsetting conditions—with great rapidity. In fact, to meet the requirements of modern high speed printing presses, such an ink must set almost instantly upon the moisture application.

It is an object of the present invention to provide an ink composition suitable for use in the moisture setting process which has high press stability under all pressroom operating conditions of humidity and which can be set with great rapidity after printing by application of moisture.

Another object of the invention is to provide an ink composition which is press stable against moisture received from the atmosphere under conditions of high relative humidity, and which, when imprinted, sets with extreme rapidity on application of moisture thereto.

Another object of the invention is to provide a printing ink of the character described adapted for use in the moisture setting process, which has press stability at high relative humidities and which can be set with great rapidity after printing by application of moisture, and in which a resinate of an aliphatic aminoalcohol, or perhaps better referred to as an alkylolamine, is used as a constituent of the ink composition.

Other objects of the invention will be apparent from the description and appended claims.

In practicing my invention the components of the ink are such that the imprinted ink will set by addition of applied moisture thereto (such as water spray, steam, a water bath, or the like), but nevertheless the ink and its constituent components such as the binder in solution, have such press stability as to resist objectionable setting or precipitation by action or absorption of atmospheric moisture even at high relative humidities.

Steam or water setting inks of the kind herein referred to contain a water precipitable binder component dissolved or dispersed in a water-miscible solvent component so that upon application to the printed surface of water, water spray, steam or the like, after printing the solvent will be diluted or removed to such an extent that the binder will be precipitated or set. Many such water precipitable binders, which are soluble in water-miscible solvents, although usable to prepare suitable inks for ordinary printing processes, have been found to be completely unsatisfactory for the preparation of steam-setting or water-setting inks. The reason for this unsatisfactory condition seems to be that such water insoluble-binder-water-miscible solvent systems are sufficiently sensitive to absorption of moisture from the air so that even slight changes in relative humidity of the atmosphere in which they are used or stored may cause the setting action. For example, when the amount of water vapor in the atmosphere is relatively high, say above 40–50 per cent relative humidity, there is a tendency for such water precipitable binder-water-miscible solvent systems to absorb moisture from the atmosphere to such an extent as to cause precipitation or setting of the water-insoluble binder. Thus when inks which contain such systems are used for printing when the relative humidity of the atmosphere around the press is high there is the objectionable tendency to set and harden on the press, with the result that unsatisfactory or poor printing results. The term "water sensitive" as used in this application with reference to moisture-setting inks means that the ink is more or less subject to deterioration or failure on the press rolls through the action or absorption of moisture in the atmosphere, and as a result, the ink fails to remain "open" on the press and either hardens or sets on the press and before printing, or fails to follow the printing rolls and to distribute properly thereon, or exhibits some other similar operating failure attributable to absorption by the vehicle system of sufficient moisture from the atmosphere, in greater or less degree depending on the nature of the vehicle system and the severity of the conditions.

I now have found that when there is used as a part of the ink composition, a resinate of an aliphatic alkylolamine, an ink vehicle is secured which is applicable for use in moisture setting processes for printing, and which is press stable in operation even under extremely high humidity conditions of pressroom operation, up to 85 per cent relative humidity or higher, and which will set substantially instantly to non-offsetting conditions, when imprinted, upon application of moisture thereto.

Among water insoluble binders usable in such water or steam setting compositions having extremely rapid water setting characteristics, excellent gloss and good pigment binding characteristics on printing are the alcohol soluble proteins such as the prolamines, including the corn protein zein, as well as shellac, rosin, ester gum, the maleic acid-terpene resins, the maleic modified rosin glyceride resins, the maleic modified rosin resins, the phenol modified cumar resins, nitrocellulose, cellulose esters and ethers and mixtures thereof. In general, film forming materials insoluble in water and soluble or dispersible in water-miscible solvents are adequately satisfactory for use in such inks, the particular binder or mixture of binders used depending upon the end characteristic of printing materials desired.

Such binders may now be used, according to the invention, to prepare satisfactory steam or water-setting inks which combine ease of steam or water setting with freedom from drying or setting on the presses at high relative humidity, and also with good distribution on the rolls of the printing presses. And these inks also are stable on the press under conditions of low relative humidity, as for example, when the relative humidity is below about 40%.

In the inks of my invention, there is utilized as part of the ink composition in connection with a water precipitable binder component, a resinate of an aliphatic alkylolamine. When such a resinate is employed as part of the composition in such steam setting or water setting inks, ink compositions are obtained which will remain open and distribute on the press rolls under pressroom operating conditions and which are stable against all pressroom humidity conditions, ranging upwards to as high as 85 per cent relative humidity, and yet which when imprinted will set to non-offsetting condition as rapidly as the less press stable inks when steam, water, or the like, is directly applied thereto. And a comparatively small percentage of the resinate is required to give such satisfactory results even at such high relative humidities.

For illustrative purposes, several examples are hereinafter given of inks which contain ink vehicles comprising water precipitable binder-water-miscible solvent systems of the invention. It will be understood that in the examples given, the particular proportions of water insoluble binder material, water-miscible solvent and pigment represent formulations which have been found to give very satisfactory results in printing operations, but the relative proportions may be varied to meet the particular conditions required for the kind of press used, its operating or printing speeds, and paper as customarily is done in the printing industry, as well understood by those skilled in the art. Further, all the formulations given below are for a black ink, but the particular coloring material, pigments and dyestuffs, if desired, may, of course, be varied to give the color requirements of any particular printing job or operation, just as in other inks. The inks described are prepared by the conventional mixing and grinding operation well known to the ink industry. The vehicles are prepared by dissolving or dispersing the binder components in the solvent component in the cold, or by gentle warming, as is customary in preparing such types of ink vehicles.

Examples of satisfactorily used inks, with differing types of binders, are illustrated by the examples which are described hereinafter.

*Example I*

| | Parts by weight |
|---|---|
| Zein | 8.0 |
| Triethanolamine resinate | 6.5 |
| Phenol resin | 12.0 |
| Water | 4.0 |
| Dipropylene glycol | 18.0 |
| Diethylene glycol | 30.0 |
| Carbon black | 16.0 |
| Alkali blue pigment | 1.0 |
| Milori blue pigment | 2.5 |
| Violet toner | 2.0 |
| | 100.0% |

The phenol resin of Example No. 1 is an alcohol soluble phenol aldehyde condensation product.

This ink was printed on a commercial press on a day when the relative humidity in the pressroom was 75%. The printing operation lasted for 40 minutes during which time no caking or setting up on the rolls occurred, and when the printing operation was discontinued the ink was still "open" on the rolls and was operating satisfactorily.

*Example II*

| | Parts by weight |
|---|---|
| Zein | 13.0 |
| Triethanolamine resinate | 15.0 |
| Diethylene glycol | 50.0 |
| Water | 2.5 |
| Carbon black | 15.0 |
| Milori blue pigment | 4.5 |
| | 100.0% |

This ink operated satisfactorily and remained open on a commercial press for over an hour a day when the relative humidity in the pressroom was 60%, and was still operating satisfactorily with no evidence of setting up when the printing operation was discontinued after an hour.

Another ink which was similar in composition to the above, except that no triethanolamine resinate was used, and a phenol resin used in place thereof, failed to print at all under the same conditions (60% relative humidity). The ink would not follow the printing rolls at all, even upon the addition to the composition of various wetting agents such as generally are used in the printing ink industry to improve this property.

*Example III*

| | Parts by weight |
|---|---|
| Zein | 7.4 |
| Triethanolamine resinate | 4.2 |
| Phenol resin | 26.9 |
| Diethylene glycol | 41.4 |
| Milori blue pigment | 3.3 |
| Carbon black | 16.8 |
| | 100.0% |

The phenol resin of Example III is also an alcohol soluble phenol aldehyde condensation product.

This ink was tested in comparison with a commercial ink containing a prolamine but containing no resinate of an aliphatic alkylolamine. The printing operation was made by spreading or "tapping out" the ink on glass plates at a relative humidity of approximately 100%. The ink of Example III remained "open" and workable during the entire length of the test, which was about 2 hours, and the ink was still in satisfactory "open" condition when the test was discontinued after the elapsed time mentioned. The commercial ink containing no triethanolamine resinate on the other hand, failed almost instantly under the described conditions, by setting up and hardening on the plate.

Example IV

| | Parts by weight |
|---|---|
| Shellac (dewaxed) | 19.0 |
| Triethanolamine resinate | 19.0 |
| Diethylene glycol | 39.0 |
| Carbon black | 18.0 |
| Milori blue pigment | 5.0 |
| | 100.0% |

This ink was printed on a Hacker proof press at pressroom relative humidity of 76% and at 74° F. and printed satisfactorily for 15 minutes— the duration of the operation. When the printing was discontinued the ink was still printing satisfactorily. Under the same conditions, an ink identical to that of Example IV except that it contained only shellac as a binder, failed completely by failing to distribute at all upon the printing rolls.

Example V

| | Parts by weight |
|---|---|
| Maleic-rosin modified resin | 28.8 |
| Triethanolamine resinate | 14.4 |
| Diethylene glycol | 33.8 |
| Carbon black | 18.0 |
| Milori blue pigment | 5.0 |
| | 100.0% |

The maleic type resin referred to above is one of those comprising a rosin modified with an alpha beta unsaturated organic polybasic acid, such as maleic acid or fumaric acid, as described in Patent No. 2,063,542 issued December 8, 1936, to Carleton Ellis. Such type of resin has a high acid number of about 300 and a melting or softening point above the temperature of ordinary steam, e. g. about 130° C.

This ink was printed on a Hacker proof press at pressroom relative humidity at 78% and at 74° F. and printed satisfactorily for 40 minutes, and was printing well when the operation was discontinued after that time. An identical ink, except that it contained only the maleic rosin resin as a binder—i. e. it had no triethanolamine resinate—printed satisfactorily, for only 2 minutes, at which time hardening began to occur, and the ink was completely dry and hard on the press after 17 minutes.

Example VI

| | Parts by weight |
|---|---|
| Terpene maleic resin | 16.6 |
| Triethanolamine resinate | 33.2 |
| Diethylene glycol | 27.2 |
| Carbon black | 18.0 |
| Milori blue pigment | 5.0 |
| | 100.0% |

The terpene maleic resin is likewise a maleic type resin, as described generally above.

This ink was printed on a Hacker proof press at pressroom relative humidity of 16% and distributed and printed well for 15 minutes after which hardening began to occur. An identical ink, except that the terpene maleic resin, with no alkylolamine resinate present, was used as the sole binder constituent failed completely to distribute on the printing rolls and no prints whatever could be obtained, a striking example of the effect of the triethanolamine resinate—it being borne in mind that no fresh ink was added during this short operation.

As set out in the above illustrative examples the percentage of alkylolamine resinate satisfactory to secure the result above set forth is within the ranges of 4% to 33% by weight of the ink and within the range of 5% to 43% by weight of the ink vehicle.

In the above the alkylolamine resinate referred to is in each instance given as the triethanolamine resinate, as this is made from readily available materials and may be readily prepared. But this is for purposes of description and is not intended to exclude the mono- and dialkylolamine resinates. Triethanolamine resinate can readily be prepared by mixing about 61% rosin by weight with about 26% triethanolamine, heating to 250° F. with stirring until homogeneous, cooling to 200° F. and adding 13% water. The described method is given as illustrative of a way of producing a satisfactory heat-reacted alkylolamine resinate material which is slightly on the alkaline side, and thus will not react with basic pigments to produce livering, gelling or other deleterious results of this nature. Also the triethanolamine is less strongly alkaline than the mono- and di-alkylolamines, and therefore requires less neutralizing acid material than either the mono- or the di-forms. The preparation of triethanolamine resinate is illustrative of treatment of the alkylolamine to produce a constituent which may be included in the vehicle or in the complete ink to give the desired resistance of the water miscible solvent and water precipitable binder to the action or absorption of moisture from the air and in which the percentage of rosin used is kept within practicable working proportions, inasmuch as in some inks rosin in too large proportion may adversely affect the binder characteristics of the set or dried ink. But if the proportions of components in the vehicle or in the finished ink are such that a larger proportion of resinate with the proportion of alkylolamine having its alkalinity suitably reduced, does not adversely affect the binding characteristics of the imprinted ink then in such event the triethanolamine ester would not necessarily be any more advantageous than the combined mono- or di-alkylolamine having the requisite reduction in its alkalinity.

Any water-miscible organic materials which are solvents for the binder materials used such as the glycols and their ethers can be used as solvents for the ink compositions described. Such solvents include diethylene glycol, triethylene glycol, dipropylene glycol, butyl ether of diethylene glycol and the like. Also other water-miscible solvents which are solvents for water insoluble binder materials may be employed for the particular printing operation, provided the solvent used is one which has adequate press stability at normal press temperatures and conditions of use, such that there is no objectionable evaporation of the solvent component during the printing operations—e. g. in the fountain or on the press rolls and distributing mechanism of a typographic press—so that the resulting ink is also adequately press stable against atmospheric moisture.

While the inks and ink composition, and the controlling constituents thereof, as described represent preferred embodiments of the invention it

What is claimed is:

1. A printing ink vehicle of the character described which is press stable at normal pressroom temperatures, comprising as essential ingredients in admixture a solvent for the binder which is also water-miscible and which is selected from the group consisting of water-soluble glycols and monoethers thereof, a water precipitatable binder constituent in said solvent, and heat-reacted neutral resinate of an alkylolamine in proportion falling within the range of 5 per cent to 43 per cent of said vehicle.

2. A printing ink vehicle of the character described which is press stable at normal pressroom temperatures, comprising as essential ingredients in admixture a solvent for the binder which is also water-miscible and which is selected from the group consisting of water-soluble glycols and monoethers thereof, a water precipitatable binder constituent in said solvent, and a heat-reacted neutral triethanolamine resinate in proportion falling within the range of 5 per cent to 43 per cent of said vehicle.

3. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable prolamine binder constituent in said solvent, and a heat-reacted neutral resinate of an alkylolamine in proportion falling within the range of 4 per cent to 33 per cent of said ink.

4. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable binder constituent comprising a prolamine and a 100 per cent phenol aldehyde resin soluble in said solvent, and a heat-reacted neutral resinate of an alkylolamine in proportion falling within the range of 4 per cent to 33 per cent of said ink.

5. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable rosin-maleic type binder constituent in said solvent, and a heat-reacted neutral resinate of an alkylolamine in proportion falling within the range of 4 per cent to 33 per cent of said ink.

6. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable prolamine binder constituent in said solvent, and a heat-reacted neutral triethanolamine resinate in proportion falling within the range of 4 per cent to 33 per cent of said ink.

7. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable binder constituent comprising a prolamine and a 100 per cent phenol aldehyde resin soluble in said solvent, and a heat-reacted neutral triethanolamine resinate in proportion falling within the range of 4 per cent to 33 per cent of said ink.

8. A printing ink of the character described which is press stable at normal pressroom temperatures, comprising coloring matter dispersed in a vehicle comprising as essential ingredients in admixture a solvent for the binder which is also water-miscible and which is selected from the group consisting of water-soluble glycols and monoethers thereof, a water precipitatable rosin-maleic type binder constituent in said solvent, and a heat-reacted neutral triethanolamine resinate in proportion falling within the range of 4 per cent to 33 per cent of said ink.

RICHARD A. DENTON.

UNITED STATES PATENTS

The following references are of record in the file of this patent:

UNITED STATES PATENTS

| Number | Name | Date |
|---|---|---|
| 2,335,882 | Pingarron | Dec. 7, 1943 |

FOREIGN PATENTS

| Number | Country | Date |
|---|---|---|
| 468,384 | Great Britain | July 2, 1937 |